(12) United States Patent
Yabuki

(10) Patent No.: US 11,776,134 B2
(45) Date of Patent: Oct. 3, 2023

(54) NON-TRANSITORY COMPUTER READABLE RECORDING MEDIUM, ELEMENT RECOGNITION METHOD, AND ELEMENT RECOGNITION SYSTEM

(71) Applicant: FUJITSU LIMITED, Kawasaki (JP)

(72) Inventor: Akihiko Yabuki, Isehara (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 16/896,291

(22) Filed: Jun. 9, 2020

(65) Prior Publication Data

US 2020/0302617 A1 Sep. 24, 2020

Related U.S. Application Data

(63) Continuation of application No. PCT/JP2017/044897, filed on Dec. 14, 2017.

(51) Int. Cl.
G06T 7/246 (2017.01)
G06T 7/11 (2017.01)
G01P 13/00 (2006.01)

(52) U.S. Cl.
CPC ............. *G06T 7/246* (2017.01); *G01P 13/00* (2013.01); *G06T 7/11* (2017.01); *G06T 2207/10028* (2013.01); *G06T 2207/30196* (2013.01)

(58) Field of Classification Search
None
See application file for complete search history.

(56) References Cited

U.S. PATENT DOCUMENTS 9,358,456 B1 * 6/2016 Challinor ................ A63F 13/44
2010/0303303 A1 * 12/2010 Shen ..................... G06V 40/20
382/107

(Continued)

FOREIGN PATENT DOCUMENTS

| JP | 2009-506441 A | 2/2009 |
| JP | 2014-509011 A | 4/2014 |
| JP | 2015-116308 A | 6/2015 |
| JP | 2015-530890 A | 10/2015 |
| JP | 2016-081504 A | 5/2016 |
| WO | 2016/056449 A1 | 4/2016 |

OTHER PUBLICATIONS

Shin, J., and Ozawa, S., "A Study on Motion Analysis of an Artistic Gymnastics by using Dynamic Image Processing," IEEE International Conference on Systems, Man and Cybernetics, 2008, pp. 1037-1042 (Year: 2008).*

(Continued)

*Primary Examiner* — Stuart D Bennett
(74) *Attorney, Agent, or Firm* — XSENSUS LLP

(57) ABSTRACT

An element recognition apparatus (100) segments three-dimensional skeleton information including a subject performing a series of performances, acquired in chronological order, into a plurality of units in accordance with a predetermined rule. The element recognition apparatus (100) determines whether a postural motion corresponding to a first unit among the units is a first motion having a feature indicating that the subject is stationary or a second motion different from the first motion. The element recognition apparatus (100) determines, based on a determination result corresponding to the first unit and a recognition result of recognition on the type of moving motion in a second unit that is continuous with the first unit, an element corresponding to the combination including at least the first unit and the second unit.

16 Claims, 14 Drawing Sheets

(56) References Cited

U.S. PATENT DOCUMENTS

| | | | |
|---|---|---|---|
| 2012/0214594 | A1 | 8/2012 | Kirovski et al. |
| 2015/0206409 | A1 | 7/2015 | Visvanathan et al. |
| 2016/0104298 | A1 | 4/2016 | Nam |
| 2017/0332946 | A1* | 11/2017 | Kikkeri ................ A61B 5/1116 |
| 2018/0357472 | A1* | 12/2018 | Dreessen ............... G06V 20/49 |

OTHER PUBLICATIONS

International Search Report and Written Opinion dated Mar. 13, 2018 for PCT/JP2017/044897 filed on Dec. 14, 2017, 9 pages including English Translation of the International Search Report.

Shin, J., and Ozawa, S., "A Study on Motion Analysis of an Artistic Gymnastics by using Dynamic Image Processing," IEEE International Conference on Systems, Man and Cybernetics, 2008, pp. 1037-1042.

Nakamura, A., et al. "Analysis of Motions and Development of Application Systems for Traditional Dances," IPSJ SIG Technical Report, vol. 2003, No. 36, Mar. 28, 2003, pp. 85-92.

Kazumi, H., et al. "Human motion reconstruction from a single view with the action model," IEICE Technical Report, vol. 99, No. 708, Mar. 17, 2000, pp. 97-104.

EESR dated Nov. 12, 2020 for the corresponding European patent application No. 17934559.0.

Office Action dated Jan. 5, 2023, in corresponding Chinese patent Application No. 201780097633.0, 19 pages.

* cited by examiner

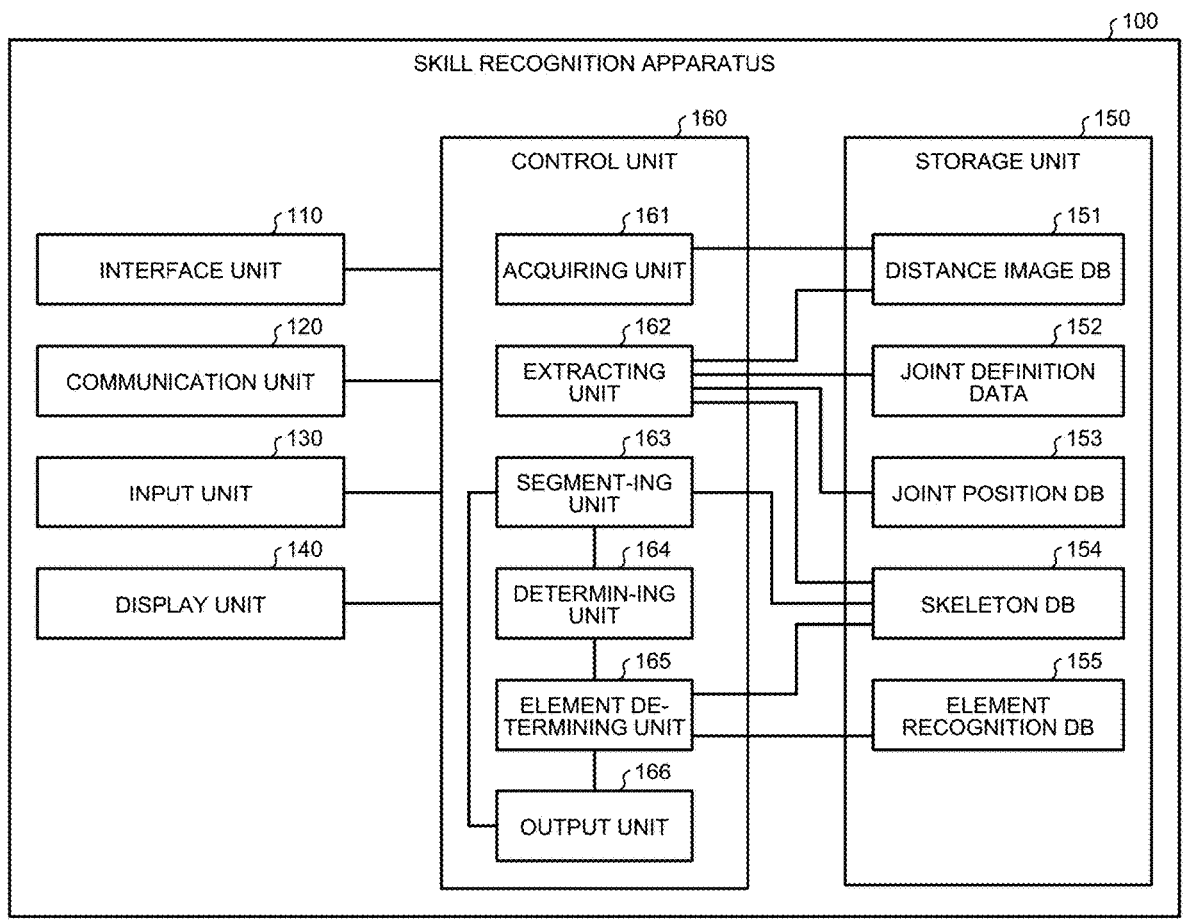

| RECORDING ID | FRAME NUMBER | X0 | Y0 | Z0 | ... | X17 | Y17 | Z17 |
|---|---|---|---|---|---|---|---|---|
| P101 | 1 | 100 | 20 | 0 | | 200 | 40 | 5 |
| P101 | 2 | 101 | 25 | 5 | | 202 | 39 | 15 |
| P101 | 3 | 110 | 32 | 7 | | 210 | 45 | 12 |
| ... | ... | | | | | | | |
| P101 | 100 | 201 | 125 | 30 | | 225 | 150 | 10 |

| RECORDING ID | FRAME NUMBER | SKELETON DATA |
|---|---|---|
| P101 | 1 | SKELETON DATA WITH RECORDING ID "P101" AND FRAME NUMBER "1" |
| | 2 | SKELETON DATA WITH RECORDING ID "P101" AND FRAME NUMBER "2" |
| | 3 | SKELETON DATA WITH RECORDING ID "P101" AND FRAME NUMBER "3" |
| ... | ... | ... |

FIG.9

| ELEMENT NAME | GROUP | SUCCESS CONDITION |
|---|---|---|
| FELGE UPWARD TO HANDSTAND | G1 | STATIONARY MOTION NAME AND MOVING MOTION NAME FOR SUCCESSFUL SKILL "FELGE UPWARD TO HANDSTAND" |
| FELGE BACKWARD WITH STRETCHED ARMS AND BODY TO CROSS | G2 | STATIONARY MOTION NAME AND MOVING MOTION NAME FOR SUCCESSFUL SKILL "FELGE BACKWARD WITH STRETCHED ARMS AND BODY TO CROSS" |
| FELGE UPWARD WITH STRETCHED ARMS TO HANDSTAND PROGRESSION | G1 | STATIONARY MOTION NAME AND MOVING MOTION NAME FOR SUCCESSFUL SKILL "FELGE UPWARD WITH STRETCHED ARMS TO HANDSTAND PROGRESSION" |
| KIP UP TO SUPPORT | G3 | STATIONARY MOTION NAME AND MOVING MOTION NAME FOR SUCCESSFUL SKILL "KIP UP TO SUPPORT" |
| BACK UPRISE TO SWALLOW STRADDLE | G3 | STATIONARY MOTION NAME AND MOVING MOTION NAME FOR SUCCESSFUL SKILL "BACK UPRISE TO SWALLOW STRADDLE" |
| ... | ... | ... |

FIG.10

| STATIONARY MOTION NAME | STATIONARY MOTION SUCCESS CONDITION | MOVING MOTION NAME | MOVING MOTION SUCCESS CONDITION |
|---|---|---|---|
| STATIONARY MOTION S1 | SUCCESS CONDITION FOR STATIONARY MOTION S1 | MOVING MOTION D1 | SUCCESS CONDITION FOR MOVING MOTION D1 |
| STATIONARY MOTION S2 | SUCCESS CONDITION FOR STATIONARY MOTION S2 | MOVING MOTION D2 | SUCCESS CONDITION FOR MOVING MOTION D2 |
| STATIONARY MOTION S3 | SUCCESS CONDITION FOR STATIONARY MOTION S3 | MOVING MOTION D3 | SUCCESS CONDITION FOR MOVING MOTION D3 |
| ... | ... | ... | ... |

FIG.11

| STATION-ARY MOTION NAME | STATIONARY MOTION SUCCESS CONDITION | | | | | |
|---|---|---|---|---|---|---|
| | SPINE ANGLE | HIP ANGLE | ARM ANGLE | ELBOW ANGLE | KNEE ANGLE | |
| STATIONARY MOTION S1 | $\leq \theta_{A1}$ | $\geq \theta_{A2}$ | $\theta_{A31}$ TO $\theta_{A32}$ | $\geq \theta_{A4}$ | $\geq \theta_{A5}$ | ... |
| STATIONARY MOTION S2 | $\leq \theta_{B1}$ | $\geq \theta_{B2}$ | $\theta_{B31}$ TO $\theta_{B32}$ | $\geq \theta_{B4}$ | $\geq \theta_{B5}$ | |
| STATIONARY MOTION S3 | $\leq \theta_{C1}$ | $\geq \theta_{C2}$ | $\theta_{C31}$ TO $\theta_{C32}$ | $\geq \theta_{C4}$ | $\geq \theta_{C5}$ | |
| ... | ... | ... | ... | ... | ... | |

FIG.13

| MOVING MOTION NAME | MOVING MOTION SUCCESS CONDITION | | | 170b |
|---|---|---|---|---|
| | END SEGMENTAL POSTURE NAME | START SEGMENTAL POSTURE NAME | FEATURE VALUE | |
| MOVING MOTION D1 | SEGMENTAL POSTURE NAME IMMEDIATELY BEFORE MOVING MOTION D1 IS PERFORMED | SEGMENTAL POSTURE NAME AT START TIME OF MOVING MOTION D1 | FEATURE VALUE (NUMBER OF ROTATIONS, NUMBER OF TWISTS, ARM POSTURE, BODY POSTURE) OF MOVING MOTION D1 | |
| MOVING MOTION D2 | SEGMENTAL POSTURE NAME IMMEDIATELY BEFORE MOVING MOTION D2 IS PERFORMED | SEGMENTAL POSTURE NAME AT START TIME OF MOVING MOTION D2 | FEATURE VALUE (NUMBER OF ROTATIONS, NUMBER OF TWISTS, ARM POSTURE, BODY POSTURE) OF MOVING MOTION D2 | |
| MOVING MOTION D3 | SEGMENTAL POSTURE NAME IMMEDIATELY BEFORE MOVING MOTION D3 IS PERFORMED | SEGMENTAL POSTURE NAME AT START TIME OF MOVING MOTION D3 | FEATURE VALUE (NUMBER OF ROTATIONS, NUMBER OF TWISTS, ARM POSTURE, BODY POSTURE) OF MOVING MOTION D3 | |
| ... | ... | ... | ... | |

FIG.14

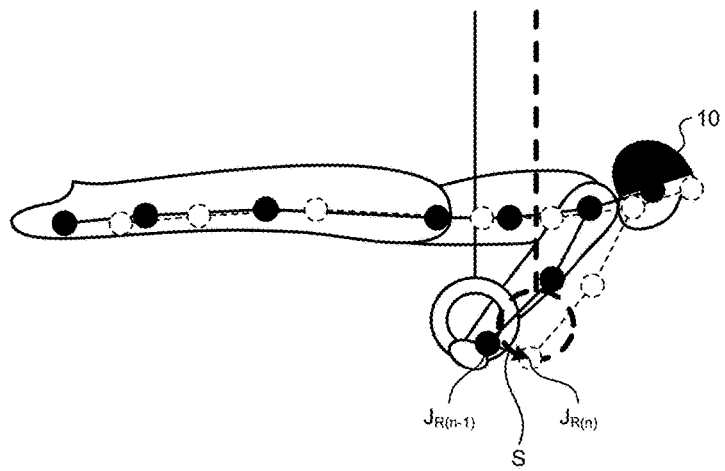

NON-TRANSITORY COMPUTER READABLE RECORDING MEDIUM, ELEMENT RECOGNITION METHOD, AND ELEMENT RECOGNITION SYSTEM

CROSS-REFERENCE TO RELATED APPLICATION

This application is a continuation application of International Application PCT/JP2017/044897 filed on Dec. 14, 2017 and designates U.S., the entire contents of which are incorporated herein by reference.

FIELD

The present invention relates to an element recognition program, and the like.

Background

For the fair and accurate evaluation on the performance of an athlete in various scoring sports, a lot of efforts and improvements have been made over many years. However, the recent technical progress in sports are remarkable, and it is sometimes difficult for the judge to make an accurate evaluation only with eyes. Therefore, there is demand for the technology to automatically evaluate the performance of an athlete.

For example, there is a conventional technology for detecting a key pose from a two-dimensional silhouette image, recognizing an element based on the combination of detected key poses, and giving a score to the element.

Patent Literature 1: Japanese Laid-Open Patent Publication No. 2015-116308

Non Patent Literature 1: Shin, J and Ozawa, S, "A Study on Motion Analysis of an Artistic Gymnastics by using Dynamic Image Processing.", IEEE International Conference on *Systems, Man, and Cybernetics*, pp. 1037-1040, 2008

SUMMARY

According to an aspect of the embodiment of the invention, a non-transitory computer readable recording medium has stored therein an element recognition program that causes a computer to execute a process including: acquiring distance image information including a subject performing a series of performances sensed by a 3D laser sensor; acquiring three-dimensional skeleton information on the subject, obtained from the distance image information, in chronological order; segmenting the three-dimensional skeleton information acquired in chronological order into a plurality of units in accordance with a predetermined rule; determining whether a postural motion corresponding to a first unit among the units is a first motion having a feature indicating that the subject is stationary or a second motion different from the first motion; and determining an element corresponding to a combination including at least the first unit and a second unit based on a determination result corresponding to the first unit and a recognition result of recognition on a type of moving motion in the second unit that is continuous with the first unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a functional block diagram illustrating a configuration of an element recognition apparatus according to the present embodiment.

FIG. 4 is a table illustrating an example of the data structure of a distance image DB according to the present embodiment.

FIG. 9 is a table illustrating an example of the data structure of an element recognition table according to the present embodiment.

FIG. 10 is a table illustrating an example of the data structure of a success condition table according to the present embodiment.

FIG. 11 is a table illustrating an example of the relationship between a stationary motion name and a stationary motion success condition.

FIG. 13 is a table illustrating an example of the relationship between a moving motion name and a moving motion success condition.

FIG. 14 is a diagram illustrating the relationship between the equipment position and the movement amount of rings.

DESCRIPTION OF EMBODIMENTS

An embodiment of an element recognition program, an element recognition method, and an element recognition system disclosed in the present application is described below in detail with reference to the drawings. Furthermore, the present invention is not limited to the embodiment.

Embodiment

However, the above-described conventional technology has a problem in that a skill is evaluated without recognizing a stationary motion or a moving motion.

The performance executed by an athlete includes a plurality of skills. Furthermore, the type of skill is recognized based on the combination of the types of motions in a plurality of units. For example, when there is a motion "X" in a certain unit, the type of skill is different and the level of difficulty of the skill or the evaluation item of the skill is different depending on whether the previous motion is a stationary motion "Y" or a moving motion "Z".

Therefore, in order to recognize a skill, there is a need to determine whether the unit corresponding to a postural motion is a stationary motion or a moving motion and to recognize the skill based on the combination of the types of moving motions in the previous unit and the subsequent unit.

According to one aspect, the present invention has an object to provide a skill recognition program, a skill recognition method, and a skill recognition system with which it is possible to recognize a skill including a stationary motion and a moving motion.

Figure 1:
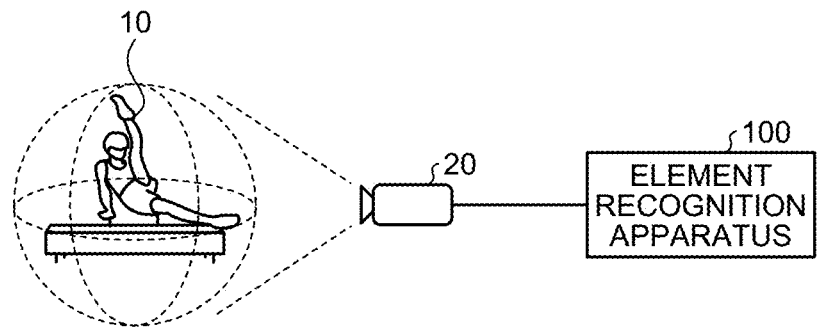
FIG. 1 is a diagram illustrating an example of an element recognition system according to the present embodiment.

FIG. 1 is a diagram illustrating an example of the element recognition system according to the present embodiment. As illustrated in FIG. 1, the element recognition system includes a 3D (three-dimensional) laser sensor 20 and an element recognition apparatus 100. The element recognition apparatus 100 is coupled to the 3D laser sensor 20.

The 3D laser sensor 20 is a sensor that executes 3D sensing on an athlete 10. The 3D laser sensor 20 outputs the distance image data as a sensing result to the element recognition apparatus 100.

For example, the distance image data includes a plurality of distance image frames, and the frame number for uniquely identifying each distance image frame is assigned to the frame in ascending order. Each distance image frame includes the information on the distance from the 3D laser sensor 20 to each point on the athlete 10.

The athlete 10 executes a predetermined performance, which is the target to be scored, in front of the 3D laser sensor 20. In the example of the case described according to the present embodiment, the athlete 10 does gymnastics; however, it is also applicable to other scoring sports.

For example, other scoring sports include trampoline, diving, figure skating, kata in karate, ballroom dancing, snowboarding, skateboarding, aerial skiing, and surfing. Furthermore, it is applicable to form checking in classical ballet, ski jumping, mogul air, turn, baseball, basketball, or the like. Further, it is also applicable to sports such as kendo, judo, wrestling, or sumo. Moreover, it may be also used for the assessment as to whether a barbell has lifted up during weight lifting.

Gymnastics are a series of motions, and the series of motions include a plurality of successive elements. Furthermore, there may be a "bridge" motion that does not correspond to an element at the beginning of or in the middle of gymnastics. In the middle of a performance of gymnastics, the judge checks the element, the posture for the basic motion forming the element, or the posture at the break of the element so as to determine the success or failure of the element or the degree of perfection of the element and provide assessment.

Here, the "posture" represents the relative positional relationship of the head, the body trunk, and the four limbs. According to the present embodiment, for example, the posture in which the stationary state needs to be maintained at the break of an element, or the like, is referred to as a "stationary motion". The posture with a movement is referred to as a "moving motion". For example, the element is determined by using the combination of the type of "stationary motion" and the type of "moving motion".

Figure 2:
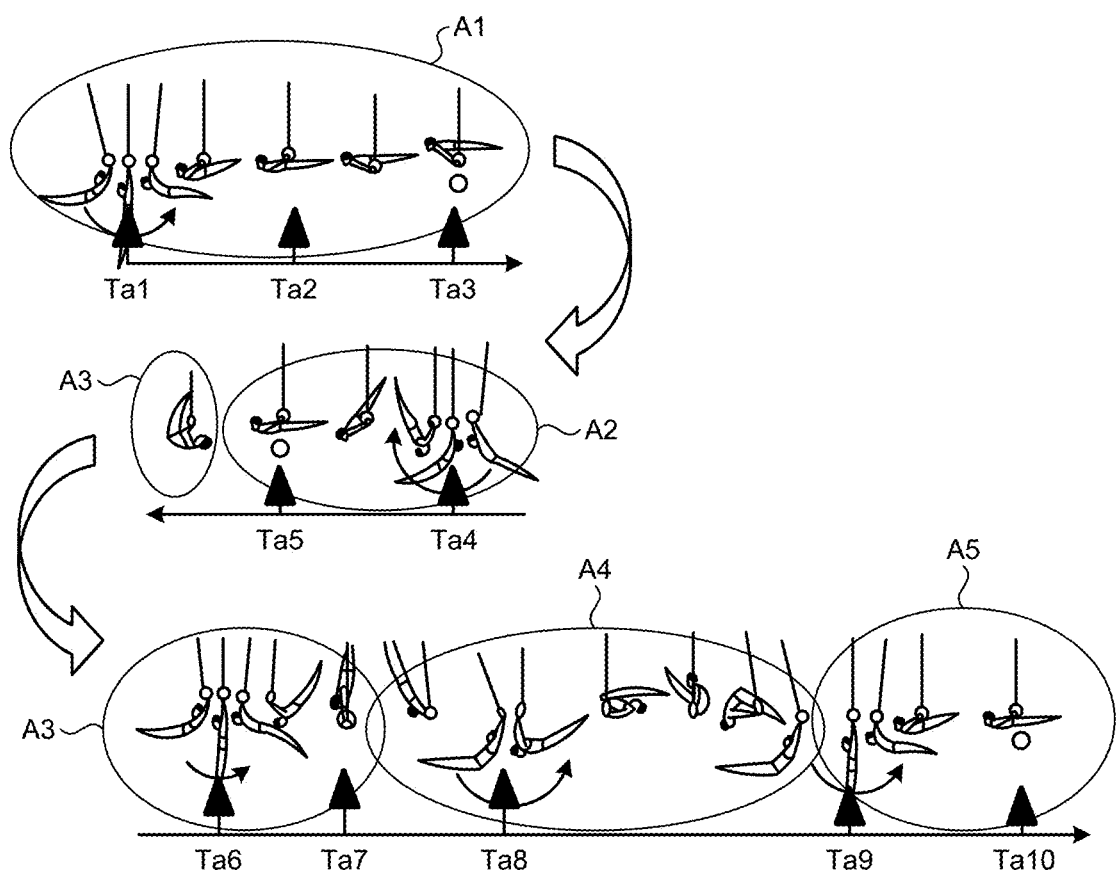
FIG. 2 is a diagram illustrating a structure example of elements.

FIG. 2 is a diagram illustrating a structure example of elements. In the example illustrated in FIG. 2, the athlete (the athlete 10) sequentially performs elements A1, A2, A3, A4, and A5. The horizontal arrow in FIG. 2 indicates the flow of time. The element A1 is "back uprise to swallow to planche (two seconds)". The element A2 is "felge upward to swallow (two seconds)". The element A3 is "back uprise to inverted cross". The element A4 is "Yamawaki pike". The element A5 is "back uprise to swallow (two seconds)".

Here, in the process of the elements A1 to A5 performed by the athlete, the postural motion of the athlete includes a plurality of segmental postures. The segmental posture indicates the posture of the athlete whose motion is temporarily stopped. In the example illustrated in FIG. 2, the athlete has a segmental posture at times Ta1, Ta2, Ta3, Ta4, Ta5, Ta6, Ta7, Ta8, Ta9, and Ta10. For example, the postural motion described in the present embodiment refers to any posture among a "segmental posture in transition", a "segmental posture in progression", and a "segmental posture in stillness" that are described later.

Furthermore, a segmental posture is classified into any one of the "segmental posture in transition" and the "segmental posture in stillness" in accordance with the continuous stationary time. For example, when the continuous stationary time is less than a first threshold (e. g., 0.5 seconds), it is a segmental posture in transition. In FIG. 2, the segmental postures at the times Ta1, Ta4, Ta6, Ta8, and Ta9 are segmental postures in transition.

In FIG. 2, the segmental postures at the times Ta2, Ta3, Ta5, Ta7, and Ta10 are segmental postures in stillness. Further, a second threshold may be further provided to set the "segmental posture in progression" in addition to the segmental posture in transition and the segmental posture in stillness. For example, the posture of which the continuous stationary time is equal to or more than the first threshold and less than the second threshold (two seconds) is the segmental posture in progression. The posture of which the continuous stationary time is equal to or more than the second threshold is the segmental posture in stillness.

The description of FIG. 1 is returned. The element recognition apparatus 100 is an apparatus that generates skeletal information on the athlete 10 based on the distance image data acquired from the 3D laser sensor 20 to recognize the element performed by the athlete 10.

FIG. 3 is a functional block diagram illustrating a configuration of the element recognition apparatus according to the present embodiment. As illustrated in FIG. 3, the element recognition apparatus 100 includes an interface unit 110, a communication unit 120, an input unit 130, a display unit 140, a storage unit 150, and a control unit 160.

The interface unit 110 is coupled to the 3D laser sensor 20. The interface unit 110 acquires the distance image data from the 3D laser sensor 20 and outputs the acquired distance image data to the control unit 160. Although the description is omitted in the present embodiment, the interface unit 110 may be coupled to a camera that captures an image of the athlete 10 so as to acquire video data from the camera.

The communication unit 120 is a device that performs data communications with other devices via a network. The communication unit 120 corresponds to a communication device. The element recognition apparatus 100 may be coupled to the 3D laser sensor 20 via a network. In this case, the communication unit 120 acquires the distance image data from the 3D laser sensor 20 via the network.

The input unit 130 is an input device for inputting various types of information to the element recognition apparatus 100. The input unit 130 corresponds to a keyboard, a mouse, a touch panel, or the like.

The display unit 140 is a display device that displays display screen information output from the control unit 160. The display unit 140 corresponds to a liquid crystal display, a touch panel, or the like.

The storage unit 150 includes a distance image DB (Data Base) 151, joint definition data 152, a joint position DB 153, a skeleton DB 154, and an element recognition DB 155. The storage unit 150 corresponds to a semiconductor memory device such as a RAM (Random Access Memory), a ROM (Read Only Memory), or a flash memory, or a storage device such as an HDD (Hard Disk Drive).

The distance image DB 151 is a DB that stores distance image data acquired from the 3D laser sensor 20. FIG. 4 is a table illustrating an example of the data structure of the distance image DB according to the present embodiment. As illustrated in FIG. 4, the distance image DB 151 associates a recording ID, a frame number, and a distance image frame. The recording ID (Identification) is the information for uniquely identifying a series of performances performed by the athlete 10. The frame number is the number for uniquely identifying each frame (distance image frame) corresponding to the same recording ID, and the number is assigned in ascending order. The distance image frame is the frame included in the distance image data sensed by the 3D laser sensor 20.

Figures 5, 6:
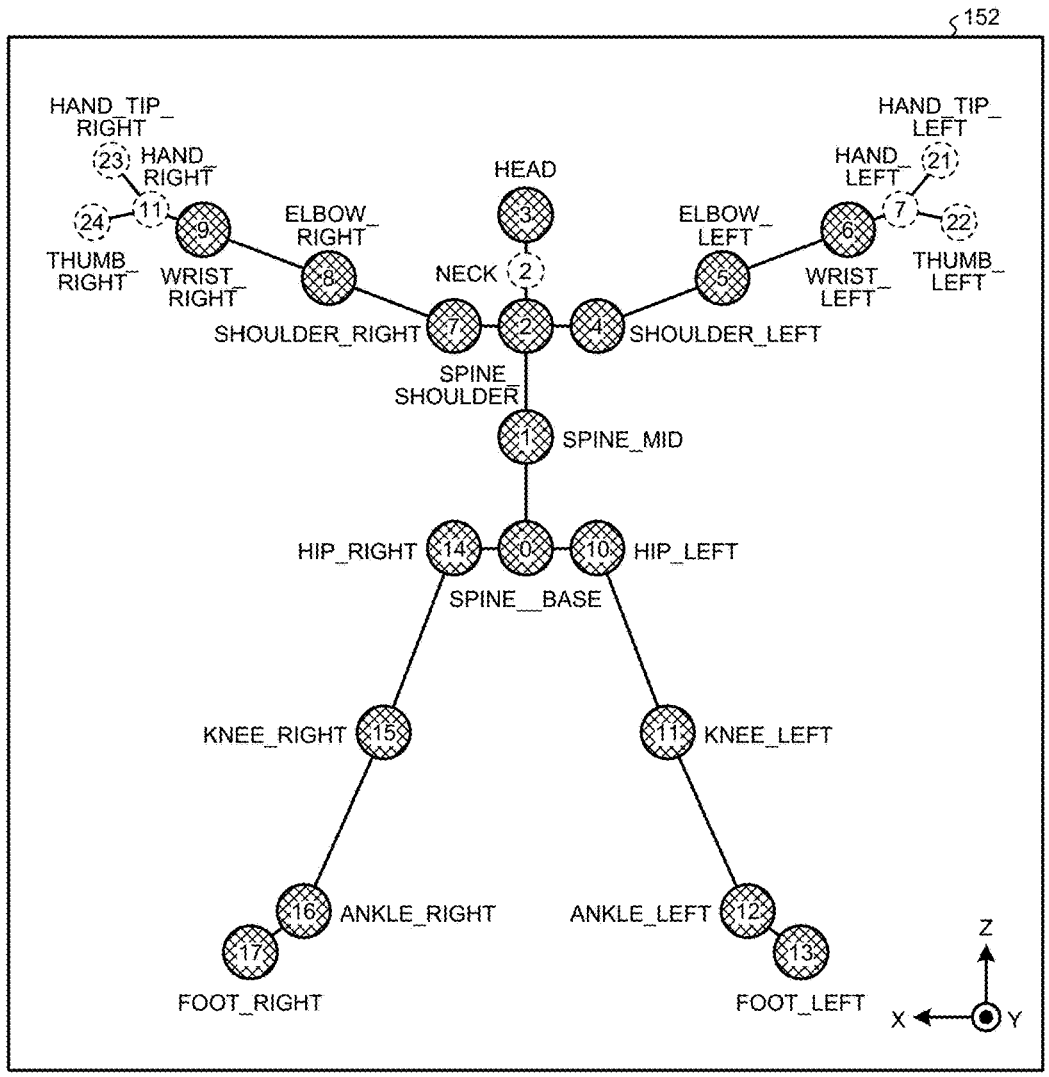
FIG. 5 is a diagram illustrating an example of the data structure of a joint definition data according to the present embodiment.
FIG. 6 is a table illustrating an example of the data structure of a joint position DB according to the present embodiment.

The joint definition data 152 defines each joint position of the athlete (the athlete 10). FIG. 5 is a diagram illustrating an example of the data structure of the joint definition data according to the present embodiment. As illustrated in FIG. 5, the joint definition data 152 stores the information on numbering of each joint determined by using a known skeleton model. For example, as illustrated in FIG. 5, No. 7 is assigned to the right shoulder joint (SHOULDER_RIGHT), No. 5 is assigned to the left elbow joint (ELBOW_LEFT), No. 11 is assigned to the left knee joint (KNEE_LEFT), and No. 14 is assigned to the right hip joint (HIP_RIGHT). Here, according to the present embodiment, the X-coordinate of the No. 8 right elbow joint is sometimes described as X8, the Y-coordinate as Y8, and the Z-coordinate as Z8. Furthermore, numbers in a dotted line are of a joint, or the like, which are not used for scoring although they are determined from the skeleton model.

The joint position DB 153 is a DB that stores the position data on each joint of the athlete 10 generated based on the distance image data of the 3D laser sensor 20. FIG. 6 is a table illustrating an example of the data structure of the joint position DB according to the present embodiment. As illustrated in FIG. 6, the joint position DB 153 associates the recording ID, the frame number, and "X0, Y0, Z0, . . . , X17, Y17, Z7". The description of the recording ID is the same as the description given for the distance image DB 151.

In FIG. 6, the frame number is the number for uniquely identifying each distance image frame corresponding to the same recording ID. "X0, Y0, Z0, . . . , X17, Y17, Z17" are the XYZ coordinates of each joint, and for example, "X0, Y0, Z0" is the three-dimensional coordinates of the joint with No. 0 illustrated in FIG. 5.

FIG. 6 illustrates time-series changes in each joint in the distance image data with the recording ID "P101", and the frame number "1" indicates that the positions of the joints are "X0=100, Y0=20, Z0=0, . . . , X17=200, Y17=40, Z17=5". Furthermore, the frame number "2" indicates that the positions of the joints have moved to "X0=101, Y0=25, Z0=5, . . . , X17=202, Y17=39, Z17=15".

Figures 7, 8:
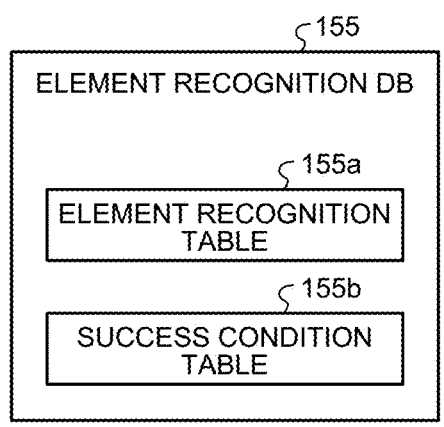
FIG. 7 is a table illustrating an example of the data structure of a skeleton DB according to the present embodiment.
FIG. 8 is a diagram illustrating an example of the data structure of an element recognition DB according to the present embodiment.

The skeleton DB 154 is a DB that stores the athlete's skeleton information generated based on the distance image data. FIG. 7 is a table illustrating an example of the data structure of the skeleton DB according to the present embodiment. As illustrated in FIG. 7, the skeleton DB 154 associates a recording ID, a frame number, and skeleton data. The descriptions of the recording ID and the frame number are the same as the description given for the distance image DB 151. The skeleton data is the data indicating the skeleton of the athlete 10 that is estimated when the joint positions are connected.

The element recognition DB 155 is a DB that is used to recognize an element (stationary motion, moving motion) included in the performance executed by the athlete 10. FIG. 8 is a diagram illustrating an example of the data structure of the element recognition DB according to the present embodiment. As illustrated in FIG. 8, the element recognition DB 155 includes an element recognition table 155a and a success condition table 155b.

The element recognition table 155a is a table that stores various types of information for recognizing an element. FIG. 9 is a table illustrating an example of the data structure of the element recognition table according to the present embodiment. As illustrated in FIG. 9, the element recognition table 155a associates an element name, a group, and a success condition. The element name is the name for uniquely identifying an element. The group indicates the group to which the element corresponding to the element name belongs.

The success condition indicates the stationary motion name and the moving motion name with which an element is successful. The success conditions of a stationary motion and a moving motion are defined by the success condition table 155b. Furthermore, the success conditions of a stationary motion and a moving motion are set for each of items, and each item is referred to as an "evaluation item" as appropriate.

FIG. 10 is a table illustrating an example of the data structure of the success condition table according to the present embodiment. As illustrated in FIG. 10, the success condition table 155b includes a table 170a and a table 170b.

The table 170a associates a stationary motion name with a stationary motion success condition. The stationary motion name indicates the name for uniquely identifying a stationary motion. The stationary motion success condition indicates the condition under which a stationary motion is successful. An example of the relationship between a stationary motion name and a stationary motion success condition is described below.

FIG. 11 is a table illustrating an example of the relationship between a stationary motion name and a stationary motion success condition. For example, each stationary motion is associated with a stationary motion success condition. The stationary motion success condition includes a plurality of evaluation items. The evaluation items for the stationary motion success condition illustrated in FIG. 11 are "spine angle", "hip angle", "arm angle", "elbow angle" and "knee angle". The stationary motion success condition may include other evaluation items.

The spine angle (Spine_Angle of an incline) is the angle formed between the line segment passing through joints No. 0 and No. 2 and the Z-axis.

The hip angle (Hip_Angle between body) is the angle formed between the line segment passing through joints No. 0 and No. 1 and the line segment passing through the joint No. 10 and the joint No. 11. Furthermore, the hip angle is the angle formed between the line segment passing through the joints No. 0 and No. 1 and the line segment passing through the joint No. 14 and the joint No. 15.

The arm angle (Arm_Angle between body) is the angle formed between the line segment passing through the joint No. 1 and the joint No. 2 and the line segment passing through the joint No. 4 and the joint No. 5. Furthermore, the arm angle is the angle formed between the line segment passing through the joint No. 1 and the joint No. 2 and the line segment passing through the joint No. 7 and the joint No. 8.

The elbow angle (Elbow_Angle) is the angle formed between the line segment passing through the joints No. 4 and No. 5 and the line segment passing through the joints No. 5 and No. 6. Furthermore, the elbow angle is the angle formed between the line segment passing through the joints No. 7 and No. 8 and the line segment passing through the joints No. 8 and No. 9.

The knee angle (Knee_Angle) is the angle formed between the line segment passing through the joints No. 10 and No. 11 and the line segment passing through the joint No. 11 and the joint No. 12. Furthermore, the knee angle is the angle formed between the line segment passing through the joints No. 14 and No. 15 and the line segment passing through the joint No. 15 and the joint No. 16.

The knee separation angle (Knees_sep. Angle) is the angle formed between the line segment passing through the joints No. 10 and No. 11 and the straight line passing through the joints No. 14 and No. 15.

For example, in the example illustrated in FIG. 11, when all of the success conditions are satisfied, such as the spine angle of "equal to or less than $\theta_{41}$", the hip angle of "equal to or more than $\theta_{42}$", the arm angle of "$\theta_{431}$ to $\theta_{432}$", the elbow angle of "equal to or more than $\theta_{44}$", and the knee angle of "equal to or more than $\theta_{45}$", the element with the stationary motion name "stationary motion S1" is successful.

Figure 12:
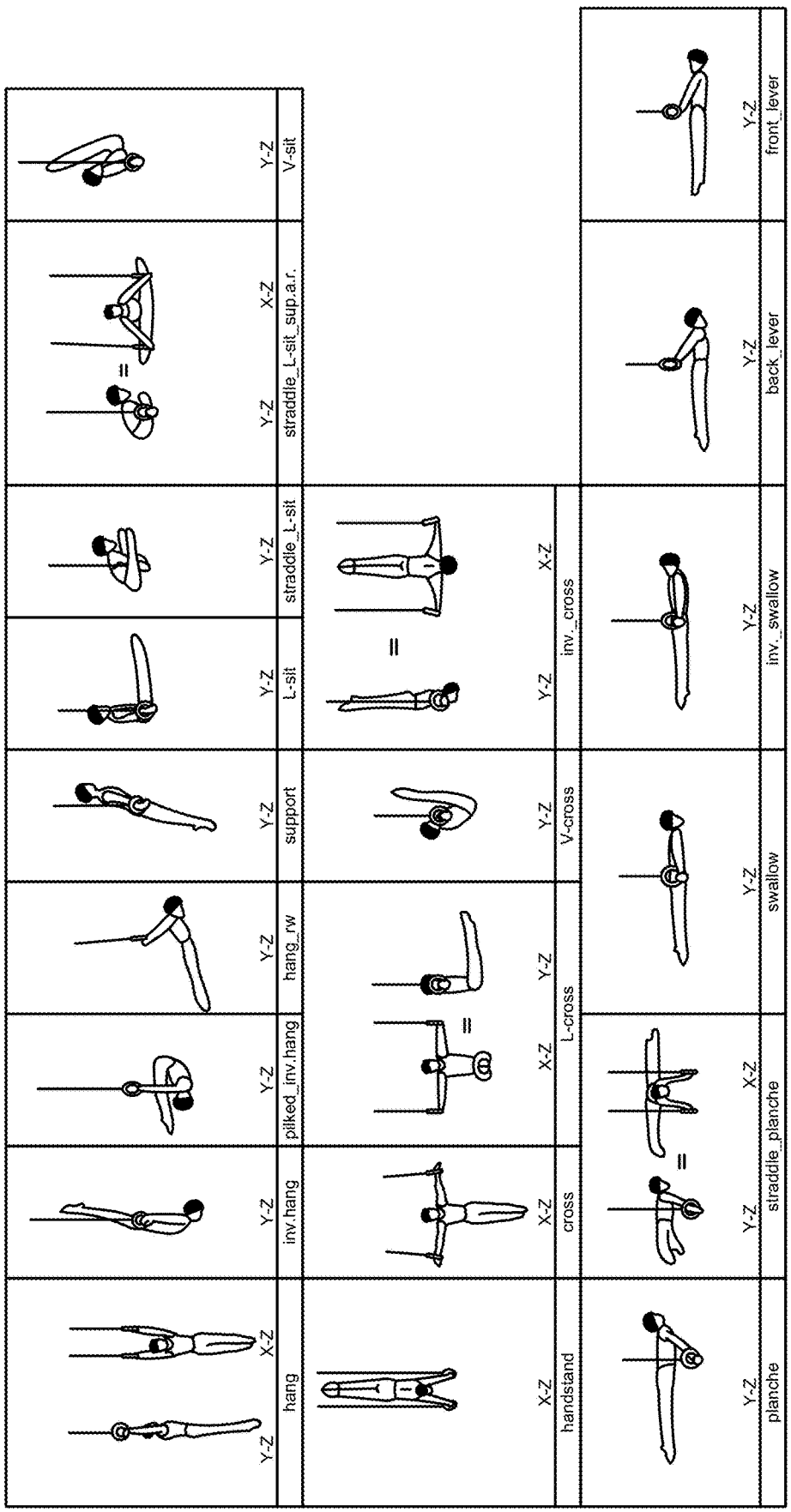
FIG. 12 is a diagram illustrating an example of each stationary motion.

FIG. 12 is a diagram illustrating an example of each stationary motion. A stationary motion (or a part) illustrated in FIG. 12 corresponds to the "segmental posture in transition", the "segmental posture in progression", and the "segmental posture in stillness" described in FIG. 2 and the like. For example, as illustrated in FIG. 12, the stationary motions include hang, inv.hang, piked_inv.hang, hang_rw, support, L-sit, straddle_L-sit, straddle_L-sit_sup.a.r., V-sit, handstand, cross, L-cross, V-cross, and inv._cross. Furthermore, the stationary motions include planche, straddled_planche, swallow, inv._swallow, back_lever, and front_lever. Moreover, in FIG. 12, Y-Z indicates the YZ plane of the athlete. X-Z indicates the XZ plane of the athlete.

The description of FIG. 10 is returned. The table 170b associates a moving motion name with a moving motion success condition. The moving motion name indicates the name for uniquely identifying a moving motion. The moving motion success condition indicates the condition under which a moving motion is successful.

FIG. 13 is a table illustrating an example of the relationship between a moving motion name and a moving motion success condition. The moving motion name indicates the name for uniquely identifying a moving motion. The moving motion success condition defines the transition of each joint position and the transition of the angle based on each joint position to make the corresponding moving motion successful.

For example, the moving motion success condition includes evaluation items such as "end segmental posture name", "start segmental posture name", and "feature value". The end segmental posture name is the name for uniquely identifying the segmental posture immediately before the corresponding moving motion is performed. The start segmental posture name is the name for uniquely identifying the segmental posture at the start time of the postural motion performed after the corresponding moving motion. The feature value is the feature of the moving motion corresponding to the number of rotations, the number of twists, the arm posture, the body posture, or the like, when the athlete performs the corresponding moving motion.

The description of FIG. 3 is returned. The control unit 160 includes an acquiring unit 161, an extracting unit 162, a segmenting unit 163, a determining unit 164, an element determining unit 165, and an output unit 166. The control unit 160 may be implemented by using a CPU (Central Processing Unit), an MPU (Micro Processing Unit), or the like. Furthermore, the control unit 160 may also be implemented by using hardwired logic such as an ASIC (Application Specific Integrated Circuit) or an FPGA (Field Programmable Gate Array).

The acquiring unit 161 acquires the distance image data from the 3D laser sensor 20 and registers the acquired distance image data in the distance image DB 151. The acquiring unit 161 associates the recording ID with the distance image data (the frame number, the distance image frame) when registering it in the distance image DB 151. The recording ID is assigned to, for example, the distance image data. The user may operate the input unit 130 to input the distance ID corresponding to the distance image data.

The extracting unit 162 performs the process to extract the positional data on each joint of the athlete 10 in chronological order and performs the process to generate skeleton data in chronological order.

An example of the process performed by the extracting unit 162 to extract the position data on each joint of the athlete 10 in chorological order is described. The extracting unit 162 compares the distance image frame in the distance image DB 151 with the joint definition data 152 to determine the type of each joint included in the frame and the three-dimensional coordinates of the joint. The extracting unit 162 registers the information in which the recording ID, the frame number, and the three-dimensional coordinates of each type of joint are associated with each other in the joint position DB 153. The extracting unit 162 repeatedly executes the above-described process for each frame number.

An example of the process performed by the extracting unit 162 to generate the skeleton data in chronological order is described. The extracting unit 162 generates the skeleton data corresponding to each frame number based on the joint position DB 153. The extracting unit 162 stores the generated skeleton data in the skeleton DB 154 in association with the recording ID and the frame number.

For example, the extracting unit 162 connects the three-dimensional coordinates of each joint stored in the joint position DB 153 based on the connection relationship defined in the joint definition data 153 to generate skeleton data.

The segmenting unit 163 is a processing unit that sequentially acquires skeleton data on the athlete 10 from the skeleton DB 154 and segments the acquired skeleton data into a plurality of units based on a predetermined rule. The segmenting unit 163 outputs a segmentation result to the determining unit 164.

An example of the process by the segmenting unit 163 is described below. The segmenting unit 163 calculates the movement amount, the horizontal oscillation, and the sum Σ of changes in the joint position of the athlete 10 based on adjacent sets of skeleton data.

The segmenting unit 163 uses Equation (1) to calculate a movement amount S of the athlete 10 from a frame number n−1 to a frame number n. For example, when the athlete 10 is performing the gymnastic rings, the movement amount S corresponds to the movement amount of the equipment position of the rings.

$$S = \sqrt{(J_{Rx(n)} - J_{Rx(n-1)})^2 + (J_{Ry(n)} - J_{Ry(n-1)})^2 + (J_{Rz(n)} - J_{Rz(n-1)})^2} \quad (1)$$

The segmenting unit 163 sets a midpoint "$J_R$" of the positions of the two wrists of the athlete 10 as an equipment position. The midpoint $J_R$ is represented by Equation (2). In Equation (2), $J_6$ indicates the three-dimensional coordinates of the joint No. 6 of the athlete 10. $J_9$ represents the three-dimensional coordinates of the joint No. 9 of the athlete 10.

$$J_R = (J_6 + J_9)/2 \quad (2)$$

FIG. 14 is a diagram illustrating the relationship between the equipment position and the movement amount of the rings. In FIG. 14, when the equipment position in the frame number n−1 is $J_{R(n-1)}$ and the equipment position in the frame number n is $J_{R(n)}$, the movement amount S is the absolute value of the difference value between $J_R(n)$ and $J_R(n-1)$ of the equipment position. When the three-dimensional coordinates of $J_R(n)$ are $(J_{RX(n)}, J_{RY(n)}, J_{RZ(n)})$ and the three-dimensional coordinates of $J_R(n-1)$ are $(J_{RX(n-1)}, J_{RY(n-1)}, J_{RZ(n-1)})$, the movement amount S is represented by the above Equation (1).

The segmenting unit 163 calculates the horizontal oscillation of the athlete 10 by using Equation (3) and Equation (4). Equation (3) represents oscillation Fx of the athlete 10 in the X-axis direction, and it is the accumulated value of $J_{RX(n)}$. Equation (4) represents oscillation Fy of the athlete 10 in the Y-axis direction, and it is the accumulated value of $J_{RY(n)}$.

$$\text{HORIZONTAL OSCILLATION } F_x = (\text{ACCUMULATION OF } J_{Rx(n)}) \quad (3)$$

$$\text{HORIZONTAL OSCILLATION } F_y = (\text{ACCUMULATION OF } J_{Ry(n)}) \quad (4)$$

The segmenting unit 163 calculates the sum Σ of changes in the joint position of the athlete 10 based on Equation (5). In Equation (5), σx, σy, and σz are calculated by using Equations (6), (7), and (8).

$$\sum = sqrt(\sigma x^2 + \sigma y^2 + \sigma z^2) \quad (5)$$

$$\sigma x = \sum_{i=0}^{17} \text{abs}\{J_{ix(n)} - J_{Rx(n)} - (J_{ix(n-1)} - J_{Rx(n-1)})\} \quad (6)$$

$$\sigma y = \sum_{i=0}^{17} \text{abs}\{J_{iy(n)} - J_{Ry(n)} - (J_{iy(n-1)} - J_{Ry(n-1)})\} \quad (7)$$

$$\sigma z = \sum_{i=0}^{17} \text{abs}\{J_{iz(n)} - J_{Rz(n)} - (J_{iz(n-1)} - J_{Rz(n-1)})\} \quad (8)$$

Equation (6) represents the movement amount of each joint position of the athlete 10 in the X-axis direction from the frame number n−1 to the frame number n and is obtained by removing the effect of the movement of the equipment. Equation (7) represents the movement amount of each joint position of the athlete 10 in the Y-axis direction from the frame number n−1 to the frame number n and is obtained by removing the effect of the movement of the equipment. Equation (8) represents the movement amount of each joint position of the athlete 10 in the Z-axis direction from the frame number n−1 to the frame number n and is obtained by removing the effect of the movement of the equipment.

In Equations (6) to (8), $J_{iX(n)}$, $J_{iY(n)}$, and $J_{iZ(n)}$ represent the three-dimensional coordinates of the joint No. i of the athlete 10 in the frame number n. $J_{iX(n-1)}$, $J_{iY(n-1)}$, and $J_{iZ(n-1)}$ represent the three-dimensional coordinates of the joint No. i of the athlete 10 in the frame number n−1. Equations (6) to (8) represent the movement amount of the three-dimensional coordinates of the athlete 10 when the equipment position $J_R$ is regarded as the origin.

For example, the segmenting unit 163 calculates the sum Σ by using Equation (5) based on the skeleton data in the frame number n−1 and the skeleton data in the frame number n and, when the value of the calculated sum Σ is less than a threshold, determines that the timing of the frame number n is the timing of segmentation. When the value of the sum Σ is continuously less than the threshold during the frame numbers n to n+m, the segmenting unit 163 determines that the section of the frame numbers n to n+m is a "segmental section". When the value of the sum Σ is less than the threshold, it means that the athlete 10 remains stationary.

Furthermore, the segmenting unit 163 may determine the timing of segmentation with the additional condition of the horizontal oscillation of the athlete 10, obtained by Equations (3) and (4), in addition to the condition that the sum Σ is more than the threshold as described above.

Furthermore, when the value of the sum Σ is equal to or more than the threshold in a frame number n+l between the frame numbers n and n+m and the value of the sum Σ is less than the threshold in a different frame number, the segmenting unit 163 may determine that the section of the frame numbers n to n+m is a "segmental section".

The segmenting unit 163 repeatedly performs the above-described process in chronological order based on the skeleton data of each frame number to determine a frame number and a segmental section that is at the segmentation timing. The segmenting unit 163 outputs the information on the frame number and the segmental section that is at the segmentation timing to the determining unit 164 as a segmentation result.

Further, the segmenting unit 163 sequentially outputs the information on the sum Σ of changes in the joint position, the information on the oscillation Fx of the athlete 10 in the X-axis direction, and the information on the oscillation Fy of the athlete 10 in the Y-axis direction to the output unit 166.

The determining unit 164 divides the chronologically arranged skeleton data into a plurality of units based on a segmentation result of the segmenting unit 163. The determining unit 164 determines whether the segmental postures included in the units are a segmental posture in transition, a segmental posture in progression, or a segmental posture in stillness. The determining unit 164 outputs the determination result to the element determining unit 165.

Figure 15:
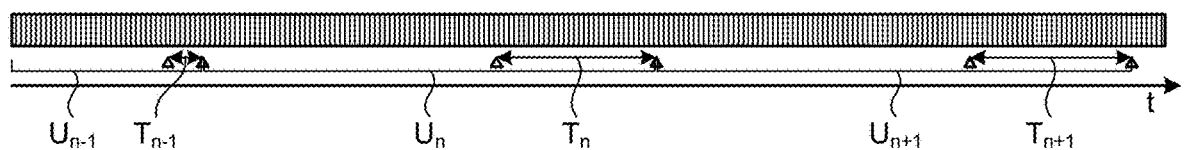
FIG. 15 is a diagram (1) illustrating a process of a determining unit according to the present embodiment.

FIG. 15 is a diagram (1) illustrating a process of the determining unit according to the present embodiment. For example, in FIG. 15, the horizontal axis represents the time axis. Furthermore, the segmental sections based on the segmentation results of the segmenting unit 163 are $T_{n-1}$, $T_n$, $T_{n+1}$. The determining unit 164 divides the skeleton data into a plurality of basic units based on the segmental sections.

The determining unit 164 divides the skeleton data into a plurality of units by using, as a basic unit, the section from the end point of the previous segmental section to the end point of the subsequent segmental section. In FIG. 15, for example, the determining unit 164 sets the section from the start point to the end point of the segmental section $T_{n-1}$ as a basic unit $U_{n-1}$. The determining unit 164 sets the section from the end point of the segmental section $T_{n-1}$ to the end point of the segmental section $T_n$ as a basic unit $U_n$. The determining unit 164 sets the section from the end point of the segmental section $T_n$ to the end point of the segmental section $T_{n+1}$ as a basic unit $U_{n+1}$.

Subsequently, based on the time length of a segmental section, the determining unit 164 determines whether the segmental posture in the segmental section is a segmental posture in transition, a segmental posture in progression, or a segmental posture in stillness.

The determining unit 164 determines that the segmental posture in the segmental section is the "segmental posture in transition" when the time length of the segmental section is less than a first time length. The determining unit 164 determines that the segmental posture in the segmental section is the "segmental posture in progression" when the time length of the segmental section is equal to or more than the first time length and less than a second time length. The determining unit 164 determines that the segmental posture in the segmental section is the "segmental posture in stillness" when the time length of the segmental section is equal to or more than the second time length. According to the present embodiment, for example, the first time length is "0.5 s", and the second time length is "2.0 s".

For example, in FIG. 15, when the time length of the segmental section $T_{n-1}$ is equal to or more than the second time length, the postural motion of the athlete 10 in the segmental section $T_{n-1}$ is a segmental posture in stillness. When the time length of the segmental section $T_n$ is equal to or more than the second time length, the postural motion of the athlete 10 in the segmental section $T_n$ is a segmental posture in stillness. When the time length of the segmental section $T_{n+1}$ is equal to or more than the second time length, the postural motion of the athlete 10 in the segmental section $T_{n+1}$ is a segmental posture in stillness.

The determining unit 164 outputs, to the element determining unit 165, the information in which the frame number corresponding to the start point and the end point of a segmental section is associated with the type of segmental posture in the segmental section. Furthermore, the determining unit 164 outputs, to the element determining unit 165, the frame number corresponding to the start point and the end point of a basic unit.

Figure 16:
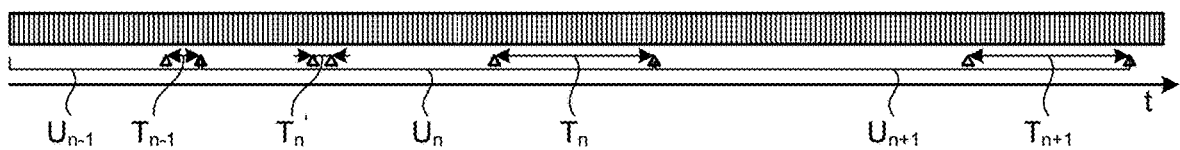
FIG. 16 is a diagram (2) illustrating a process of the determining unit according to the present embodiment.

Further, the determining unit 164 may correct the basic unit in accordance with the type of segmental section. For example, the determining unit 164 combines adjacent basic units when the type of segmental section is a "segmental posture in progression". FIG. 16 is a diagram (2) illustrating a process of the determining unit according to the present embodiment. For example, when the time length of a segmental section $T_n'$ is less than the first time length, the postural motion of the athlete 10 in the segmental section $T_n'$ is a segmental posture in transition. In this case, the determining unit 164 does not divide the basic unit before or after the segmental section $T_n'$ but includes the segmental section $T_n'$ in the basic unit Un.

The determining unit 164 outputs the information on a basic unit and the information on a segmental section as a determination result to the element determining unit 165. For example, the information on a basic unit includes the start point and the end point (frame number) of each basic unit described with reference to FIG. 15 and the like. The information on a segmental section includes the start point and the end point (frame number) of each segmental section. Furthermore, the information on a segmental section includes the information indicating whether the segmental section is a "segmental section in transition", a "segmental section in progression" or a "segmental section in stillness".

The description in FIG. 3 is returned. The element determining unit 165 is a processing unit that determines an element for each basic unit based on a determination result of the determining unit 164. The basic unit includes a moving motion and a postural motion. The element determining unit 165 determines the element corresponding to a basic unit based on the combination of the type of moving motion and the type of postural motion.

Based on the start point and the end point of a basic unit and the start point and the end point of a segmental section, the element determining unit 165 divides the basic unit into a unit for recognizing the type of moving motion and a unit for recognizing the type of segmental posture. In the following description, a unit for recognizing the type of moving motion is referred to as a "moving motion section" as appropriate. A unit for recognizing the type of segmental posture is referred to as a "segmental section".

Figure 17:
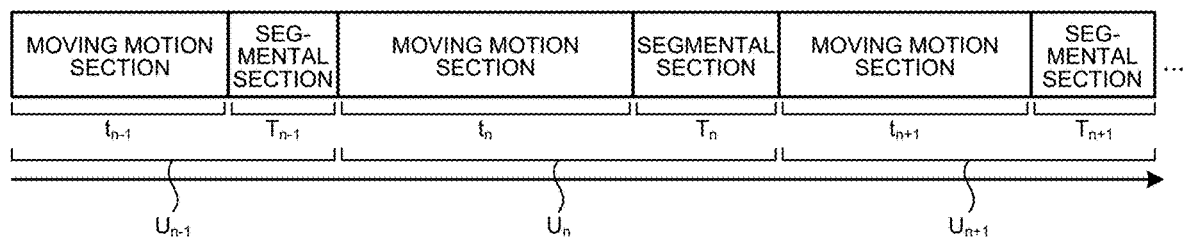
FIG. 17 is a diagram illustrating a process of an element determining unit according to the present embodiment.

FIG. 17 is a diagram illustrating a process of the element determining unit according to the present embodiment. In the example illustrated in FIG. 17, the basic unit $U_{n-1}$ includes a moving motion section $t_{n-1}$ and the segmental section $T_{n-1}$. The basic unit Un includes a moving motion section $t_n$ and the segmental section $T_n$. The basic unit $U_{n+1}$ includes a moving motion section $t_{n+1}$ and the segmental section $T_{n+1}$.

The element determining unit 165 determines the type of moving motion included in the moving motion section based on the skeleton data corresponding to the moving motion section and the element recognition DB 155 (the table 170b). The element determining unit 165 determines the moving motion name depending on any of the moving motion success conditions in the table 170b corresponding to the feature of the skeleton data corresponding to the moving motion section. To determine the moving motion name, the element determining unit 165 determines "end segmental posture name", "start segmental posture name", and "feature value" as described with reference to FIG. 13.

An example of the process performed by the element determining unit 165 to determine the end segmental posture name is described. The element determining unit 165 determines a segmental posture name (stationary motion name) immediately before the moving motion section as the end segmental posture name. For example, in the case of the frame number n at the start point of the moving motion section, the skeleton data in the frame number n−1 is compared with the stationary motion success condition defined by the table 170a to determine the stationary motion name. The determined stationary motion name is any one of the stationary motions illustrated in FIG. 12.

For example, it is assumed that, with regard to the evaluation items obtained from the skeleton data in the frame number n−1, all the success conditions are satisfied, such as the spine angle of "equal to or less than $\theta_{41}$", the hip angle of "equal to or more than $\theta_{42}$", the arm angle of "$\theta_{431}$ to $\theta_{432}$", the elbow angle of "equal to or more than $\theta_{44}$", and the knee angle of "equal to or more than $\theta_{45}$". In this case, as the element with the stationary motion name "stationary motion S1" is successful, the element determining unit 165 determines that the "stationary motion S1" is the end segmental posture name.

An example of the process performed by the element determining unit 165 to determine the start segmental posture name is described. The element determining unit 165 determines a segmental posture name (stationary motion name) at the time of the start of a segmental section (the start of a postural motion) as the start segmental posture name. For example, in the case of the frame number n at the start point of the segmental section, the skeleton data in the frame number n is compared with the stationary motion success condition defined by the table 170a to determine the stationary motion name. The determined stationary motion name is any one of the stationary motions illustrated in FIG. 12.

An example of the process performed by the element determining unit 165 to determine the feature value is described. The element determining unit 165 determines the number of rotations, the number of twists, the arm posture, and the body posture of the athlete 10 based on the skeleton data included in the moving motion section and sets the determined information as a feature value. For example, the arm posture corresponds to "straight arm, bent arm" or the like, and the body posture corresponds to "layout, pike, tuck", or the like. Furthermore, to calculate the feature value, the element determining unit 165 may correct the three-dimensional coordinates of the movement data included in the moving motion section to the three-dimensional coordinates using the midpoint of the equipment as the origin and may calculate the feature value using the corrected three-dimensional coordinates.

The element determining unit 165 performs the above-described process to determine the end segmental posture name, the start segmental posture name, and the feature value. The element determining unit 165 compares the group of the end segmental posture name, the start segmental posture name, and the feature value determined with the moving motion success condition in the table 170b to determine the corresponding moving motion name.

On the other hand, when there is no stationary motion name (segmental posture name) corresponding to the end segmental posture name and the start segmental posture name, the element determining unit 165 disapproves of a moving motion in the moving motion section. Furthermore, when there is no moving motion success condition corresponding to the group of the end segmental posture name, the start segmental posture name, and the feature value, the element determining unit 165 disapproves of a moving motion in the moving motion section.

The element determining unit 165 determines the type of segmental posture (stationary motion) included in the segmental section based on the skeleton data corresponding to the segmental section and the element recognition DB 155 (the table 170a). The element determining unit 165 determines the segmental posture name (stationary motion name) depending on any of the stationary motion success conditions in the table 170a corresponding to the feature of the skeleton data corresponding to the segmental section.

For example, the element determining unit 165 determines any frame number among the frame numbers from the start point to the end point of the segmental section. The element determining unit 165 compares the skeleton data corresponding to the determined frame number with the stationary motion success conditions defined in the table 170a to determine the stationary motion name. The determined stationary motion name is any one of the stationary motions illustrated in FIG. 12.

The element determining unit 165 performs the above-described process to determine the pair of the moving motion name in the moving motion section and the stationary motion name in the segmental section included in the same basic unit. Further, the element determining unit 165 determines whether the segmental posture (stationary motion) corresponding to the segmental section is the "segmental posture in progression" or the "segmental posture in stillness".

The element determining unit 165 compares the moving motion name in the moving motion section and the stationary motion name in the segmental section included in the same basic unit with the success condition in the element recognition table 155a to determine that the element name corresponding to the success condition is the element performed by the athlete 10 as a basic unit.

Here, an example of the element corresponding to the moving motion name and the stationary motion name (the type of postural motion in the segmental section) is described. For example, when the moving motion name of the basic unit is "felge backward with stretched arms and body" and the stationary motion name in stillness is "cross (two seconds)", the element determining unit 165 determines that the element of the basic unit is "felge backward with stretched arms and body to cross".

When the moving motion name of the basic unit is "felge upward" and the stationary motion name in stillness is "handstand (two seconds)", the element determining unit 165 determines that the element of the basic unit is "felge upward to handstand".

When the moving motion of the basic unit is "disapproval" and the stationary motion name in stillness is "cross (two seconds)", the element determining unit 165 determines that the element of the basic unit is "cross".

When the moving motion name of the basic unit is "felge upward with stretched arms" and the stationary motion name in progression is "handstand", the element determining unit 165 determines that the element of the basic unit is "felge upward with stretched arms to handstand progression".

It is assumed that the basic motion includes a moving motion and a plurality of stationary motions after the moving motion and this combination is "combination 1". In this case, as the successive stationary motion names are identical, the element determining unit 165 determines that the name of the stationary motion name S1 in stillness in addition to a moving motion D1 is the name of the element in the basic unit. Furthermore, if the stationary motion names are identical, the names of the elements are identical regardless of the number of stationary motions performed after the moving motion.

Combination 1: "the moving motion name D1"+"the stationary motion name S1" in progression+"the stationary motion name S1" in transition+"the stationary motion name S1" in stillness=the element with the element name "the moving motion name D1+the stationary motion name S1" is successful.

It is assumed that the basic motion includes a moving motion and a plurality of stationary motions after the moving motion and this combination is "combination 2". As in the combination 2, in a case where, after the stationary motion in progression, the posture is changed into a different posture and then the initial stationary motion is returned, the element determining unit 165 determines that the stationary motion name is the name of the element in the basic unit.

Combination 2: "the moving motion name D1"+"the stationary motion name S1" in progression+"a different stationary motion name (posture deviation)"+"the stationary motion name S1" in stillness=the element with the element name "the stationary motion name S1" is successful.

It is assumed that the basic motion includes a moving motion and a plurality of stationary motions after the moving motion and this combination is "combination 3". As in the combination 3, in a case where, after the stationary motion in transition, the posture is changed into a different posture and then the initial stationary motion is returned, the element determining unit 165 determines that the moving motion name D1 in addition to the stationary motion name is the name of the element in the basic unit.

Combination 3: "the moving motion name D1"+"the stationary motion name S1" in transition+"a different stationary motion name (posture deviation)"+"the stationary motion name S1" in stillness=the element with the element name "the moving motion name D1+the stationary motion name S1" is successful.

The element determining unit 165 repeatedly performs the above-described process on each basic unit to determine the element name of each basic unit. The element determining unit 165 sequentially outputs the element name corresponding to the basic unit to the output unit 166. Furthermore, the element determining unit 165 sequentially outputs the information on the feature value of the athlete 10 to the output unit 166.

Here, it is assumed that the element recognition apparatus 100 executes real-time processing to determine an element name. For example, in FIG. 17, the element determining unit 165 determines the moving motion name in the moving motion section $t_{n+1}$ when the moving motion section $t_{n+1}$ ends. The element recognition apparatus 100 determines the stationary motion name when the segmental section $T_{n-1}$ ends and determines the name of the element of the basic unit $U_{n-1}$ based on the combination of the moving motion name and the stationary motion name. Similarly, the element determining unit 165 determines the name of the element of the basic unit $U_n$ when the moving motion section $t_n$ and the segmental section $T_n$ end. The element determining unit 165 determines the name of the element of the basic unit $U_{n+1}$ when the moving motion section $t_{n+1}$ and the segmental section $T_{n+1}$ end.

The output unit 166 is a processing unit that causes the display unit 140 to output and display the element name information when the element name determined by the element determining unit 165 is received.

Furthermore, the output unit 166 may generate the graph information indicating the temporal changes in the feature value of the skeleton data on the athlete 10, the sum Σ of changes in the joint position, and time changes in the oscillations Fx, Fy of the athlete 10 in the X-direction and in the Y-direction and cause the display unit 140 to output and display the generated graph information. According to the present embodiment, for example, the feature value of skeleton data is the rotation angle, the waist angle, and the upper arm angle of the athlete 10.

Figure 18:
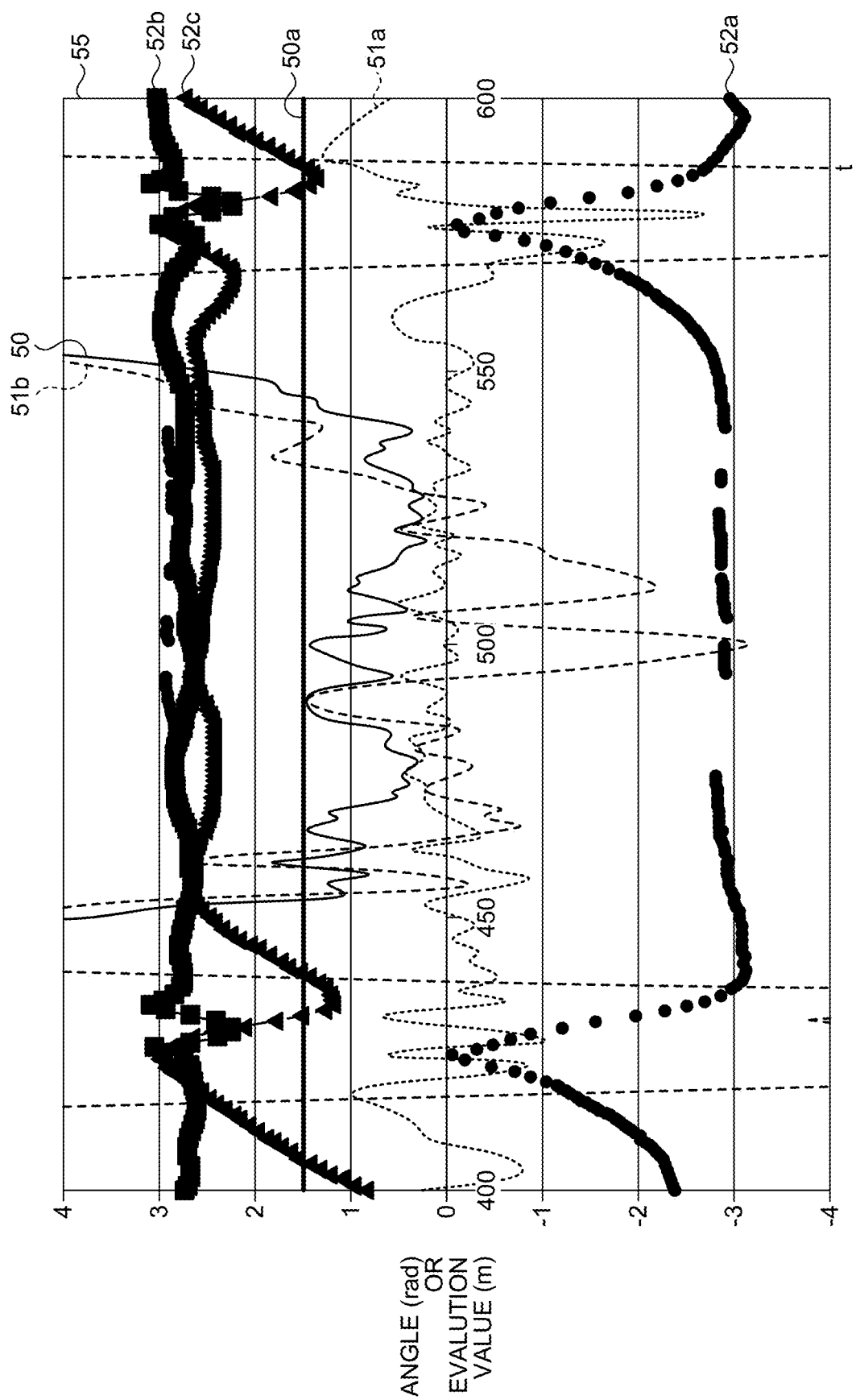
FIG. 18 is a graph illustrating an example of graph information according to the present embodiment.

FIG. 18 is a graph illustrating an example of the graph information according to the present embodiment. In a graph 55 of FIG. 18, the horizontal axis represents a time axis (frame number). The vertical axis is an axis corresponding to the angle or the values of the sum Σ and the oscillations Fx, Fy. In FIG. 18, a line segment 50 is the line segment indicating time changes in the sum Σ of changes in the joint position calculated by using Equation (6). A line segment 50a is the threshold for determining whether the athlete 10 is stationary. While the line segment 50 is less than the threshold 50a, it is indicated that the athlete 10 is stationary.

A line segment 51a represents the time change in the oscillation Fx. A line segment 51b represents the time change in the oscillation Fy. A line segment 52a represents the rotation angle of the athlete 10, and it has a positive value in the case of a forward rotation and has a negative value in the case of a backward rotation. A line segment 52b represents the waist angle of the athlete 10. A line segment 52c represents the upper arm angle of the athlete 10. The feature values (the time changes of the line segments 52a, 52b, and 52c) of the skeleton data illustrated in FIG. 18 are feature values corresponding to the element "felge upward to handstand".

For example, the judge refers to the graph illustrated in FIG. 18 to check whether the sum Σ of changes in the joint position falls below the threshold (the line segment 50a) so as to check whether the athlete 10 is stationary during the stationary motion "handstand".

Figure 19:
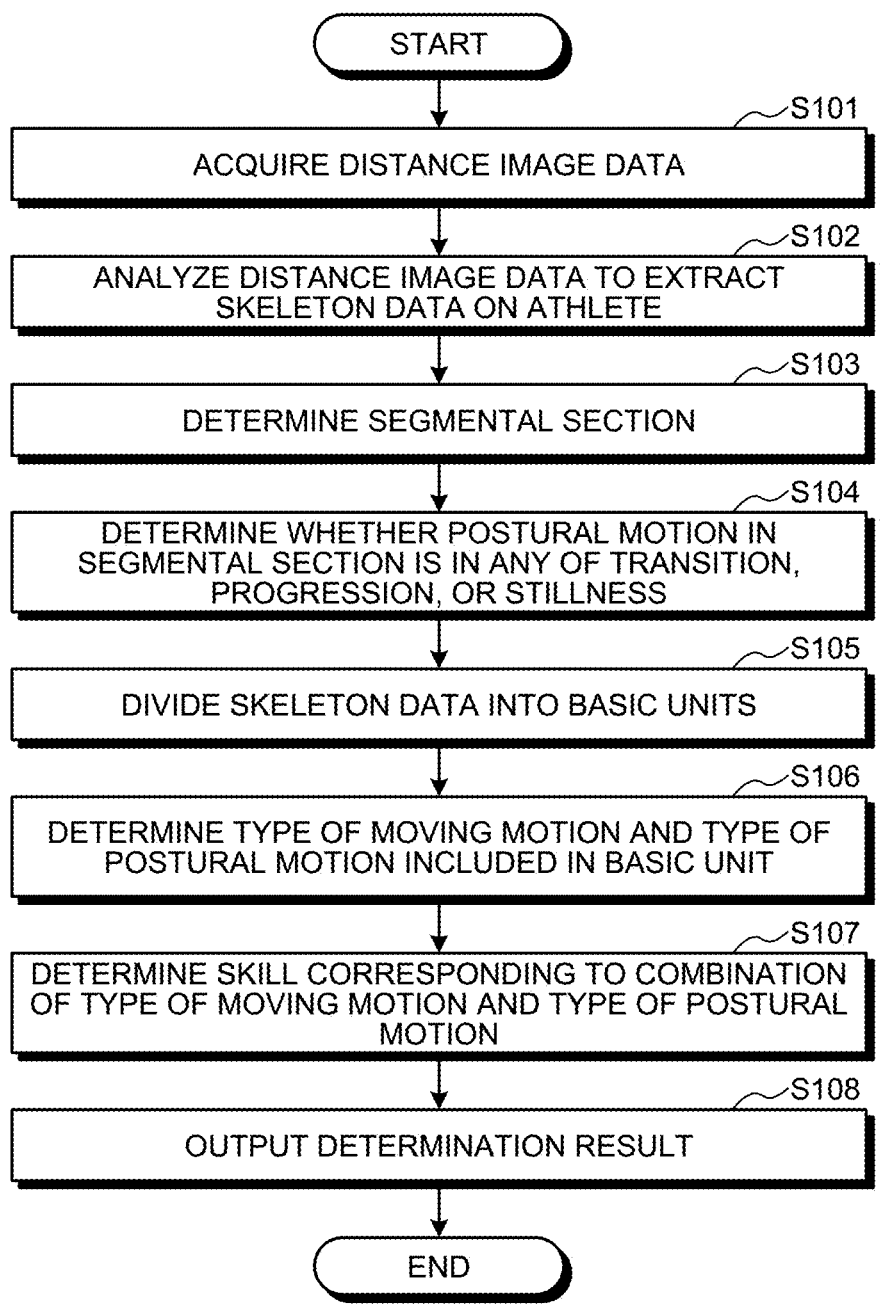
FIG. 19 is a flowchart illustrating the steps of a process of the element recognition apparatus according to the present embodiment.

Next, an example of the steps of a process of the element recognition apparatus 100 according to the present embodiment is described. FIG. 19 is a flowchart illustrating the steps of a process of the element recognition apparatus according to the present embodiment. As illustrated in FIG. 19, the acquiring unit 161 of the element recognition apparatus 100 acquires distance image data from the 3D laser sensor 20 (Step S101). The extracting unit 162 of the element recognition apparatus 100 analyzes the distance image data to extract the skeleton data on the athlete 10 (Step S102).

The segmenting unit 163 of the element recognition apparatus 100 determines a segmental section (Step S103). The determining unit 164 of the element recognition apparatus 100 determines whether the postural motion in the segmental section is in transition, in progression, or in stillness (Step S104). The determining unit 164 divides the skeleton data into basic units (Step S105).

The element determining unit 165 of the element recognition apparatus 100 determines the type of moving motion and the type of postural motion included in a basic unit (Step S106). The element determining unit 165 determines the element corresponding to the combination of the type of moving motion and the type of postural motion (Step S107). The output unit 166 of the element recognition apparatus 100 outputs the element determination result to the display unit 140 (Step S108).

Next, an advantage of the element recognition apparatus 100 according to the present embodiment is described. The element recognition apparatus 100 determines a segmental section based on whether the postural motion of the athlete 10 is stationary. Furthermore, the element recognition apparatus 100 divides the time-series skeleton data by a basic unit including a moving motion section and a segmental section and determines an element based on the combination of the type of moving motion in the moving motion section and the type of stationary motion in the segmental section. This makes it possible to recognize the element including a plurality of unit actions in a scoring sport for which there is a need to recognize an element while considering whether the posture of the athlete 10 is stationary.

The element recognition apparatus 100 determines that the section in which the sum $\Sigma$ of changes in the joint position of the athlete 10 is less than the threshold is a segmental section and, in accordance with the time length of the segmental section, determines whether the stationary motion included in the segmental section is a stationary motion in transition, a stationary motion in progression, or a stationary motion in stillness. Thus, it is possible to properly recognize the name of the element in accordance with the type of stationary motion in the segmental section.

Furthermore, in the performance (rings, parallel bars, or trampoline) using equipment, the equipment itself may oscillate due to the athlete 10 who is hanging down or mounting on. Here, even when the athlete 10 is stationary, the oscillation of the equipment itself may be added to the transition of the joint position of the skeleton data acquired sequentially in chronological order.

Furthermore, when the equipment is oscillating in accordance with the oscillation of the athlete 10 in addition to the oscillation of the equipment itself due to the athlete 10 who is handing down or mounting on, it is preferable to recognize that the athlete 10 is oscillating and to reflect it to the success of the element or the performance.

Here, to evaluate the posture of the athlete 10, the element recognition apparatus 100 corrects the three-dimensional coordinates of the skeleton data on the athlete 10 to the three-dimensional coordinates based on the center position of the equipment and evaluates the posture of the athlete 10 based on the corrected three-dimensional coordinates. Thus, with the element recognition apparatus 100, it is possible to properly evaluate the posture of the athlete 10 while eliminating the effect of the oscillation of the equipment itself.

Furthermore, according to the above-described embodiment, for example, the performance executed by the athlete 10 is rings, the value of the sum $\Sigma$ of changes in the joint position illustrated in Equation (6) is compared with the threshold to set a segmental section, and a postural motion is determined; however, this is not a limitation. For example, as described later, the element may be determined in the same manner in a scoring sport other than rings. An example of the process performed by the element recognition apparatus 100 to determine an element of an athlete who performs vault is described below.

Figure 20:
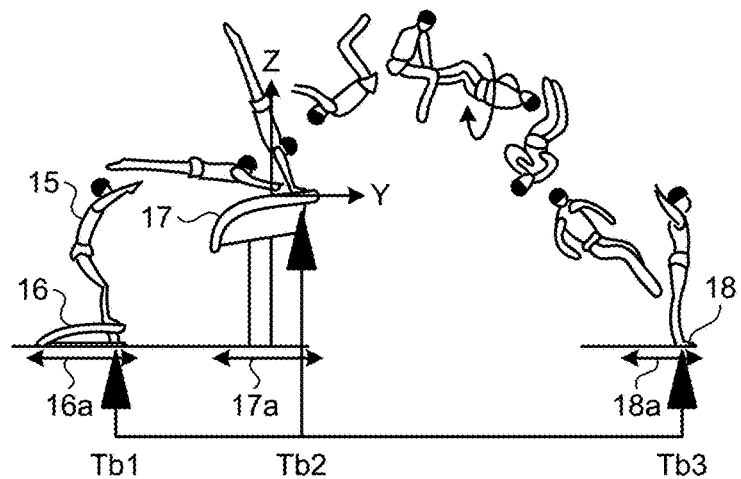
FIG. 20 is a diagram illustrating another example for setting a segmental section.

FIG. 20 is a diagram illustrating another example for setting a segmental section. In the example illustrated in FIG. 20, an athlete 15 performs vault. The element recognition apparatus 100 uses an evaluation function $\Sigma 1$, an evaluation function $\Sigma 2$, and an evaluation function $\Sigma 3$ to set a plurality of segmental sections. The evaluation function $\Sigma 1$, the evaluation function $\Sigma 2$, and the evaluation function $\Sigma 3$ are defined as described below.

The evaluation function $\Sigma 1$ specifies a timing Tb1 of the postural motion at the moment when the athlete 15 takes off a springboard surface 16. For example, the segmental section in which the value of the evaluation function $\Sigma 1 \leq TH1$ includes the postural motion at the moment of the take-off.

The evaluation function $\Sigma 1$ is an evaluation function that uses the Z coordinate values of the joints No. 12 and No. 16 of the athlete 15 as sampling values and obtains a change between the sampling value of the frame number n and the sampling value of the frame number n−1. Furthermore, the evaluation function $\Sigma 1$ is applied while a section 16a of the springboard surface 16 includes the Y coordinate values of the joints No. 12 and No. 16 of the athlete 15.

The evaluation function $\Sigma 2$ specifies a timing Tb2 at which the athlete 15 makes a successful handstand support on a vault surface 17. For example, the segmental section in which the value of the evaluation function $\Sigma 2 \leq TH2$ includes the postural motion at the moment of the successful handstand support.

The evaluation function $\Sigma 2$ is an evaluation function that uses the Z coordinate values of the joints No. 6 and No. 9 of the athlete 15 as sampling values and obtains a change between the sampling value of the frame number n and the sampling value of the frame number n−1. Furthermore, the evaluation function $\Sigma 2$ is applied while a section 17a of the vault surface 17 includes the Y coordinates of the joints No. 6 and No. 9 of the athlete 15.

The evaluation function $\Sigma 3$ specifies a timing Tb3 of the postural motion at the moment when the athlete 15 lands on a mat 18. For example, the segmental section in which the value of the evaluation function $\Sigma 3 \leq TH3$ includes the postural motion at the moment of the landing.

The evaluation function $\Sigma 3$ is an evaluation function that uses the Z coordinate values of the joints No. 12 and No. 16 of the athlete 15 as sampling values and obtains a change between the sampling value of the frame number n and the sampling value of the frame number n−1. Furthermore, the evaluation function $\Sigma 3$ is applied while a section 18a of the mat 18 includes the Y coordinates of the joints No. 12 and No. 16 of the athlete 15.

Figure 21:
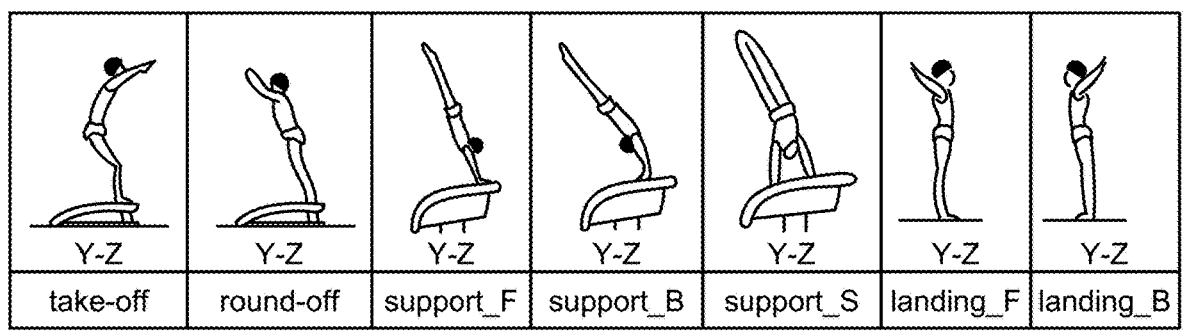
FIG. 21 is a diagram illustrating an example of a postural motion in each segmental section during vault.

FIG. 21 is a diagram illustrating an example of the postural motion in each segmental section during vault. For example, when the time length of the segmental section in which the value of the evaluation function $\Sigma 1 \leq TH1$ is equal to or more than 0.1 seconds, the element recognition apparatus 100 determines whether the segmental section includes the postural motion take-off or round-off.

When the time length of the segmental section in which the value of the evaluation function $\Sigma 2 \leq TH2$ is equal to or more than 0.1 seconds, the element recognition apparatus 100 determines whether the segmental section includes the postural motion support_F, support_B, or support_S.

When the time length of the segmental section in which the value of the evaluation function $\Sigma 3 \leq TH3$ is equal to or more than 0.5 seconds, the element recognition apparatus 100 determines whether the segmental section includes the postural motion landing_F or landing_B.

Furthermore, in FIG. 20, the section from the timing Tb1 to Tb2 and the section from Tb2 to Tb3 is a moving motion section. The element recognition apparatus 100 determines the type of moving motion in a moving motion section in the same manner as in the process of the element determining unit 165 described above.

The element recognition apparatus 100 determines the element of the athlete 15 who is performing vault based on the combination of each type of postural motion and the type of moving motion determined as described above. Although the case of the determination on the element of vault is described here as an example, the element may be determined in the same manner for other scoring sports.

Figure 22:
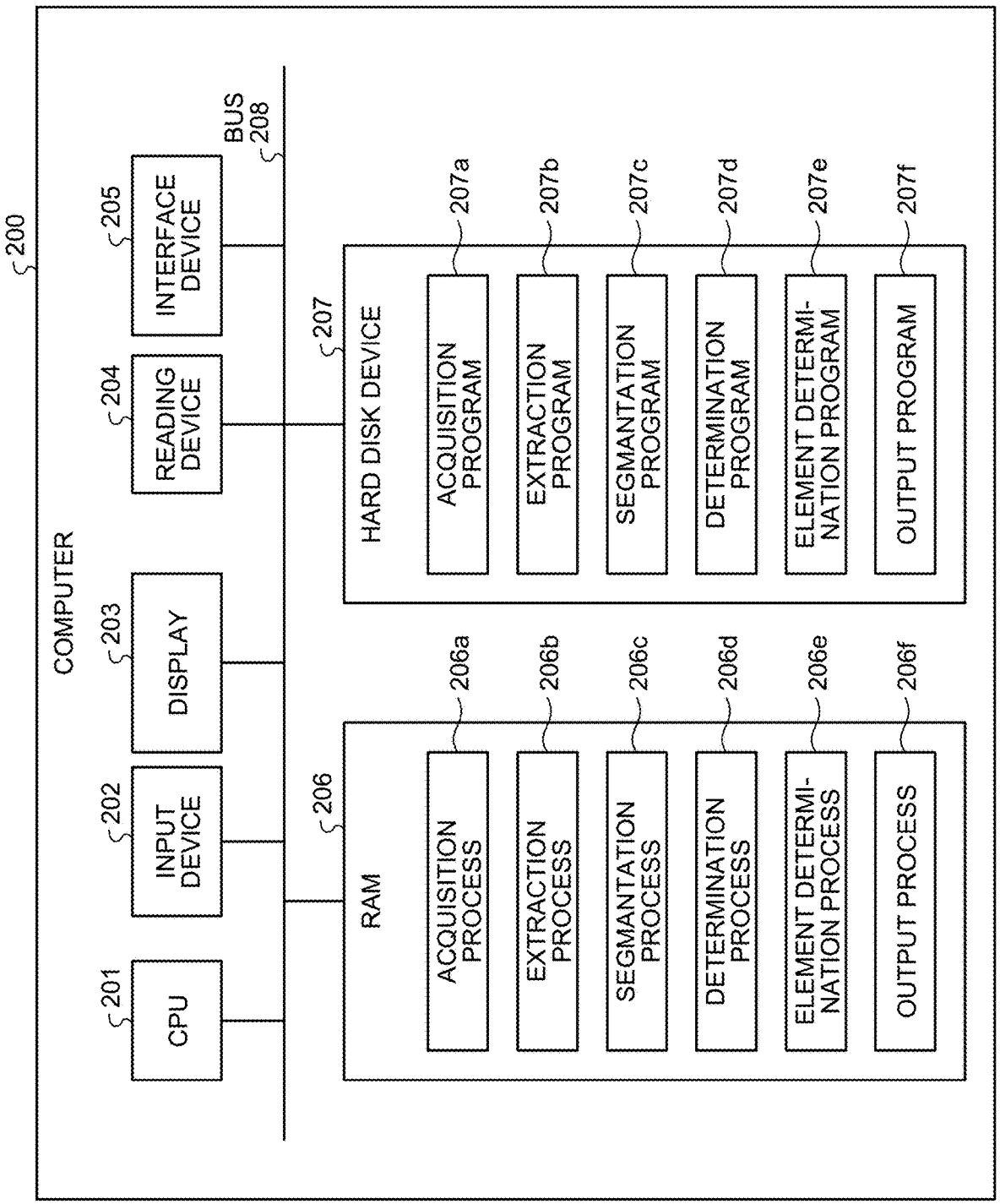
FIG. 22 is a diagram illustrating an example of the hardware configuration of a computer that performs the same function as that of the element recognition apparatus.

Next, an example of the hardware configuration of a computer that performs the same function as that of the element recognition apparatus 100 described in the present embodiment is described. FIG. 22 is a diagram illustrating an example of the hardware configuration of the computer that performs the same function as that of the element recognition apparatus.

As illustrated in FIG. 22, a computer 200 includes a CPU 201 that executes various types of arithmetic processing; an input device 202 that receives input of data from a user; and a display 203. Furthermore, the computer 200 includes a reading device 204 that reads a program or the like from a storage medium; and an interface device 205 that transmits and receives data to and from a different computer via a wireless network. Moreover, the computer 200 includes a RAM 206 that temporarily stores various types of information; and a hard disk device 207. Further, each of the devices 201 to 207 is connected to a bus 208.

The hard disk device 207 includes an acquisition program 207a, an extraction program 207b, a segmentation program 207c, a determination program 207d, an element determination program 207e, and an output program 207f. The CPU 201 reads the acquisition program 207a, the extraction program 207b, the segmentation program 207c, the determination program 207d, the element determination program 207e, and the output program 207f and loads them into the RAM 206.

The acquisition program 207a functions as an acquisition process 206a. The extraction program 207b functions as an extraction process 206b. The segmentation program 207c functions as a segmentation process 206c. The determination program 207d functions as a determination process 206d. The element determination program 207e functions as an element determination process 206e. The output program 207f functions as an output process 206f.

A process of the acquisition process 206a corresponds to a process of the acquiring unit 161. A process of the extraction process 206b corresponds to a process of the extracting unit 162. A process of the segmentation process 206c corresponds to a process of the segmenting unit 163. A process of the determination process 206d corresponds to a process of the determining unit 164. A process of the element determination process 206e corresponds to a process of the element determining unit 165. A process of the output process 206f corresponds to a process of the output unit 165.

Furthermore, each of the programs 207a to 207f does not always need to be initially stored in the hard disk device 207. For example, each program is stored in a "portable physical medium" such as a flexible disk (FD), a CD-ROM, a DVD, a magneto-optical disk, or an IC card, which is inserted into the computer 200. Furthermore, the computer 200 may read and execute each of the programs 207a to 207f.

Advantageous Effects of Invention

It is possible to recognize an element including a stationary motion and a moving motion.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium having stored therein an element recognition program that causes a computer to execute a process comprising:
   acquiring distance image information including a subject performing a series of performances sensed by a 3D laser sensor;
   acquiring three-dimensional skeleton information on the subject, obtained from the distance image information, in chronological order;
   segmenting a time axis of the distance image information, based on movement amount of each joint position of the subject calculated from the three-dimensional skeleton information acquired in chronological order, into a plurality of units;
   recognizing a stationary motion name of a postural motion at a first unit among the units based on the three-dimensional skeleton information and a table stored in a memory that associates a stationary motion name with a stationary motion success condition, wherein the postural motion is determined, from the movement amount, to have a feature indicating that the subject is stationary; and
   recognizing a moving motion name at a second unit that is continuous with the first unit based on the three-dimensional skeleton information and a table stored in the memory that associates a moving motion name with a moving motion success condition, and determining an element name corresponding to a combination including at least the recognized stationary motion name at the first unit and the recognized moving motion name at the second unit, based on a table stored in the memory that associates an element name and a success condition indicating the stationary motion name and the moving motion name.

2. The non-transitory computer readable recording medium according to claim 1, wherein the second unit that is continuous with the first unit corresponding to the postural motion is a unit previous to the first unit.

3. The non-transitory computer readable recording medium according to claim 1, wherein, when the series of performances are performances using equipment, the recognizing process corrects the three-dimensional skeleton information on the subject based on a position of the equipment and determines whether the postural motion has the feature based on the corrected three-dimensional skeleton information.

4. The non-transitory computer readable recording medium according to claim 1, wherein the recognizing process determines whether the postural motion has the feature based on a period in which the movement amount in adjacent sets of the three-dimensional skeleton information that are continuous in chronological order is less than a threshold.

5. The non-transitory computer readable recording medium according to claim 4, the process further comprising generating visible screen information associating a time-series change in the joint position with a time-series change in a position of equipment and displaying the generated visible screen information.

6. The non-transitory computer readable recording medium according to claim 5, wherein the visible screen information includes element name.

7. An element recognition method comprising:
   acquiring distance image information including a subject performing a series of performances sensed by a 3D laser sensor, using a processor;
   acquiring three-dimensional skeleton information on the subject, obtained from the distance image information, in chronological order, using the processor;
   segmenting a time axis of the distance image information, based on movement amount of each joint position of the subject calculated from the three-dimensional skeleton information acquired in chronological order, into a plurality of units, using the processor;

recognizing a stationary motion name of a postural motion at a first unit among the units based on the three-dimensional skeleton information and a table stored in a memory that associates a stationary motion name with a stationary motion success condition, wherein the postural motion is determined, from the movement amount, to have a feature indicating that the subject is stationary, using the processor; and recognizing a moving motion name at a second unit that is continuous with the first unit based on the three-dimensional skeleton information and a table stored in the memory that associates a moving motion name with a moving motion success condition, and determining an element name corresponding to a combination including at least the recognized stationary motion name at the first unit and the recognized moving motion name at the second unit, based on a table stored in the memory that associates an element name and a success condition indicating the stationary motion name and the moving motion name, using the processor.

8. The element recognition method according to claim 7, wherein the second unit that is continuous with the first unit corresponding to the postural motion is a unit previous to the first unit.

9. The element recognition method according to claim 7, wherein, when the series of performances are performances using equipment using equipment, the recognizing process corrects the three-dimensional skeleton information on the subject based on a position of the equipment and determines whether the postural motion has the feature based on the corrected three-dimensional skeleton information.

10. The element recognition method according to claim 7 wherein the recognizing process determines whether the postural motion has the feature based on a period in which the movement amount in adjacent sets of the three-dimensional skeleton information that are continuous in chronological order is less than a threshold.

11. The element recognition method according to claim 10, further comprising generating visible screen information associating a time-series change in the joint position with a time-series change in a position of equipment and displaying the generated visible screen information.

12. An element recognition system comprising:

a 3D laser sensor sensing a subject performing a series of performances to generate distance image information; and an element recognition apparatus comprising:
  a processor configured to:
    acquire the distance image information from the 3D laser sensor,
    acquire three-dimensional skeleton information on the subject, obtained from the distance image information, in chronological order and segments a time axis of the distance image information, based on movement amount of each joint position of the subject calculated from the three-dimensional skeleton information acquired in chronological order into a plurality of units,
    recognize a stationary motion name of a postural motion at a first unit among the units based on the three-dimensional skeleton information and a table stored in a memory that associates a stationary motion name with a stationary motion success condition, wherein the postural motion is determined, from the movement amount, to have a feature indicating that the subject is stationary, and
    recognize a moving motion name at a second unit that is continuous with the first unit based on the three-dimensional skeleton information and a table stored in the memory that associates a moving motion name with a moving motion success condition, and determine an element name corresponding to a combination including at least the recognized stationary motion name at the first unit and the recognized moving motion name at the second unit, based on a table stored in the memory that associates an element name and a success condition indicating the stationary motion name and the moving motion name.

13. The element recognition system according to claim 12, wherein the second unit that is continuous with the first unit corresponding to the postural motion is a unit previous to the first unit.

14. The element recognition system according to claim 12, the processor further configured to, when the series of performances are performances using equipment using equipment, correct the three-dimensional skeleton information on the subject based on a position of the equipment and, determine whether the postural motion has the feature based on the corrected three-dimensional skeleton information.

15. The element recognition system according to claim 12, the processor further configured to determine whether the postural motion has the feature based on a period in which the movement amount in adjacent sets of the three-dimensional skeleton information that are continuous in chronological order is less than a threshold.

16. The element recognition system according to claim 15, the processor further configured to generate visible screen information associating a time-series change in the joint position with a time-series change in a position of equipment and displays the generated visible screen information.

* * * * *